US008507600B2

(12) United States Patent
Kohlstruk et al.

(10) Patent No.: US 8,507,600 B2
(45) Date of Patent: *Aug. 13, 2013

(54) POLYOLEFIN GRAFT POLY(METH)ACRYLATE COPOLYMER-BASED PRIMING AGENT FOR POLYOLEFIN SURFACES

(75) Inventors: Stephan Kohlstruk, Duelmen (DE); Sven Balk, Frankfurt (DE); Hinnerk Gordon Becker, Essen (DE); Lutz Mindach, Bochum (DE); Thomas Arnold, Gelnhausen (DE); Cornelia Baumann, Linsengericht (DE); Elke Seipel, Alzenau (DE)

(73) Assignees: Evonik Roehm GmbH, Darmstadt (DE); Evonik Degussa GmbH, Essen (DE)

( * ) Notice: Subject to any disclaimer, the term of this patent is extended or adjusted under 35 U.S.C. 154(b) by 15 days.

This patent is subject to a terminal disclaimer.

(21) Appl. No.: 13/144,968

(22) PCT Filed: Feb. 26, 2010

(86) PCT No.: PCT/EP2010/052447
§ 371 (c)(1),
(2), (4) Date: Jul. 18, 2011

(87) PCT Pub. No.: WO2010/108754
PCT Pub. Date: Sep. 30, 2010

(65) Prior Publication Data
US 2011/0281054 A1    Nov. 17, 2011

(30) Foreign Application Priority Data
Mar. 26, 2009 (DE) .......... 10 2009 001 885

(51) Int. Cl.
*C08L 51/00* (2006.01)
*B32B 1/08* (2006.01)
*F16L 11/04* (2006.01)
*B05D 1/00* (2006.01)
*B05D 7/00* (2006.01)

(52) U.S. Cl.
USPC ......... 524/504; 525/72; 428/35.8; 428/36.91; 427/387; 427/407.1; 427/412.3

(58) Field of Classification Search
USPC ....................................................... 524/504
See application file for complete search history.

(56) References Cited

U.S. PATENT DOCUMENTS

| | | | |
|---|---|---|---|
| 5,412,029 A * | 5/1995 | Elm et al. .......... | 525/71 |
| 8,025,758 B2 * | 9/2011 | Loehden et al. .......... | 156/325 |
| 2005/0124753 A1 * | 6/2005 | Ashihara et al. .......... | 524/543 |
| 2008/0057205 A1 * | 3/2008 | Lohden et al. .......... | 427/387 |
| 2008/0214757 A1 | 9/2008 | Becker et al. | |
| 2009/0018251 A1 | 1/2009 | Ashihara et al. | |
| 2010/0029836 A1 | 2/2010 | Hirose et al. | |
| 2011/0060078 A1 | 3/2011 | Becker et al. | |
| 2011/0088777 A1 | 4/2011 | Becker et al. | |
| 2011/0300322 A1 * | 12/2011 | Kohlstruk et al. ......... | 428/36.91 |

FOREIGN PATENT DOCUMENTS

| | | |
|---|---|---|
| GB | 2 225 332 | 5/1990 |
| WO | 2008 072689 | 6/2008 |
| WO | 2008 126510 | 10/2008 |

OTHER PUBLICATIONS

International Search Report issued Apr. 19, 2010 in PCT/EP10/052447 filed Feb. 26, 2010.
U.S. Appl. No. 13/201,522, filed Aug. 15, 2011, Kohlstruk, et al.
U.S. Appl. No. 13/144,968, filed Jul. 18, 2011, Kohlstruk, et al.

* cited by examiner

*Primary Examiner* — David W Wu
*Assistant Examiner* — Josephine Chang
(74) *Attorney, Agent, or Firm* — Oblon, Spivak, McClelland, Maier & Neudstadt, L.L.P.

(57) ABSTRACT

The invention relates to a novel halogen-free and acid-free, readily soluble priming bonding agent for polyolefins, said agent containing (meth)acrylate-grafted, amorphous polyolefins.

20 Claims, No Drawings

POLYOLEFIN GRAFT POLY(METH)ACRYLATE COPOLYMER-BASED PRIMING AGENT FOR POLYOLEFIN SURFACES

FIELD OF THE INVENTION

Polyolefins, such as polyethylene, polypropylene, EPDM, or poly-α-olefins, are very important as material for example in the packaging industry, or the automotive industry, or for producing moldings, for example the case of a cell phone. The only disadvantage of these materials, which are easy to process and inexpensive, are their surface properties. Polyolefins cannot be directly coated or adhesive-bonded. A primer or some other type of pretreatment of the material is required for this purpose. The present invention relates to a novel halogen-free and acid-free, readily soluble priming binder which is intended for polyolefins and which comprises amorphous polyolefins grafted with (meth)acrylates.

PRIOR ART

Surface modification of very nonpolar materials, such as polyolefins, has for a long time been a central topic of research in universities and industry. Polypropylenes or polyethylenes cannot be coated directly with the polar binders that form the basis for most adhesives or coatings. The adhesion of polymers such as polyesters, polyamides, polyacrylates, polymethacrylates, or polyurethanes to polyolefins is generally insufficient for this purpose. Polyolefin foils are therefore mostly subjected to a high-energy corona treatment for surface-polarization purposes prior to the coating process. However, this type of process cannot be used on moldings with edges and with irregularly shaped surfaces. The only possibility here is flame treatment, which is complicated to carry out and often leads to poor results in the edge region of particularly irregularly shaped objects. Better results can therefore be achieved with a polymer solution which has good application properties and which is used as primer.

Primers of this type are often based on halogen-containing paraffins or polymers. In this connection by way of example, see DE 100 11 384, which describes polydichlorobutadienes. However, the adhesion provided by systems of this type is not sufficiently good to permit complete omission of pretreatment, for example flame treatment.

WO 2006 124 232 describes a coating system which has to be UV-cured after application. This type of coating system not only requires an additional operation but also exhibits further disadvantages, for example reduced shelflife.

WO 2008 031 677 combines polyolefins with resins based on ketone resins and/or on aldehyde resins, as adhesion promoter. However, in comparison with single-component systems said system has the disadvantage of possible occurrence of phase separation, and of restricted scope of application.

WO 2008 039 595 describes an aqueous coating system which is composed of polyolefin-polyether block copolymers having a high proportion of anionic groups. The person skilled in the art can readily discern that this type of system can be used only with very low solids contents, and that good film formation from an aqueous solution with a high proportion of sparingly soluble polyolefin blocks is difficult.

US 2004 0072 960 describes primers which are obtained through the esterification of carboxylated polyolefins with polyfunctional alcohols. The alcohols involve low-molecular-weight compounds having three or more OH groups. The person skilled in the art can readily discern that an excessive degree of carboxylation leads to reduced adhesion to polyolefins, and that on the other hand an inadequate degree of carboxylation leads in turn to inadequate polar functionalization of the surface.

There is a versatile process that has been known for a long time for grafting of mostly amorphous polyolefins with acrylates and/or methacrylates. A process in the form of a free-radical solution polymerization process has been described by way of example in DE 101 50 898. In Badel et al. (J. of Pol. Sc.; Part A: Pol. Chem.; 45, 22, p. 5215, 2007) there is a reaction via a reactive extrusion process. A variant of said process with alternative initiation is found in WO 2004 113 399. A controlled graft reaction by way of halogen modification of a polyolefin followed by an atom transfer radical polymerization process is found in Kaneko et al. (Macromol. Symp., 290, pp. 9-14, 2007). None of said specifications describes any coating of, or priming of, polyolefin surfaces.

In U.S. Pat. No. 6,310,134, amorphous polyolefins are grafted with acids or anhydrides, e.g. acrylic acid or methacrylic acid. A disadvantage of polymers of this type is poor solubility in organic and aqueous solvents. Said specification solves the problem of poor solubility by using very low solids contents below 15% by weight. For uniform coating it is therefore necessary to use very large amounts of solvent, otherwise the resultant surface is very irregular. In U.S. Pat. No. 5,523,358, polypropylenes are analogously grafted with acids. Here, the graft copolymer is solid during and after the reaction, and the only possible method of applying it to the substrate is a heterogeneous method or a method that uses extrusion coating. However, both processes lead to primers that are nonuniform and/or very thick.

In U.S. Pat. No. 6,262,182, the problem of the poor solubility of the acid-modified, amorphous polyolefins is solved by using high-boiling-point aromatics as solvents. However, solvents of this type have great disadvantages during application, in relation to emissions and toxicity, and also drying temperatures and/or drying times.

Silane reagents can also be used to modify polyolefins, mostly amorphous poly-α-olefins. Systems of this type are described by way of example in WO 2007 008 765 and EP 1 900 773. A disadvantage of copolymers of this type is the high proportion of olefin and the proportion of functional, polar groups, which is only small. Said polar groups usually involve alkoxysilyl groups, and these contribute only very little to solubility improvement. Again, therefore, these polymers have only poor solubility and therefore are difficult to apply and cannot be applied with accuracy.

In EP 1 900 773, poly-α-olefins grafted with a small amount of silyl groups are described. Although said products exhibit very good adhesion, these polymers again have a very high proportion of olefin and have only poor solubility in organic solvents, i.e. can be dissolved only at very low concentrations therein.

In EP 1 601 470 and EP 1 508 579, polyolefins functionalized with silyl groups are likewise described as primers. A disadvantage of systems of this type is moreover that the adhesion to the coating is provided exclusively by way of the silyl groups. However, shelflife is known to be relatively low here, and the proportion of the functional groups therefore has to be kept low.

In DE 195 16 457, the mixture of modified polyolefins of this type with acid-modified polyolefins is described, as adhesive. The person skilled in the art can readily discern that a system of this type has only very poor storage properties. In comparison with a polar polymer, an adhesive of this type also exhibits reduced adhesion values and/or initial adhesion values, because of the small number of functional groups.

In WO 2007/001694, adhesive compositions are described which comprise functionalized polymers (e.g. silane-grafted or maleic-anhydride-grafted propylene polymers). The main polymers are produced with metallocene catalysts and do not have the required properties.

In WO 2007/002177, adhesive compositions based on random poly(propylene) copolymers having a proportion of at least 50% by weight of propylene and functionalized polyolefin copolymers and nonfunctionalized adhesive resins are described, where the enthalpy of fusion of the poly(propylene) copolymers is from 0.5 to 70 J/g and the proportion of isotactic propylene triads therein is at least 75%, and the content of functional monomer units in the functionalized syndiotactic polymers used is at least 0.1%. The poly(propylene) copolymers described are preferably produced through metallocene catalysis. The functionalized polyolefin copolymers encompass functionalized poly(propylene) copolymers, syndiotactic polypropylene copolymers, and the materials known as isotactic-atactic polypropylene graft polymers. There is no description of main polymers with high proportions of higher 1-olefins, e.g. a proportion of 1-butene. The resultant ratio of grafting/functionalization to chain cleavage is poor, because the proportion of isotactic polypropylene units (with a high level of free-radical polymer degradation) is sometimes very high. Functional monomer units mentioned are in particular maleic anhydride and glycidyl methacrylates, but also various other functional groups, e.g. vinylsilanes. The polyolefins are modified exclusively with small amounts of said functional units, and are not grafted with (meth)acrylate mixtures.

OBJECT

It was an object of the present invention to discover a novel process for coating polyolefin surfaces with coating formulations or, respectively, adhesive formulations which exhibit no direct adhesion on polyolefins. In particular, the intention is to provide a novel primer which has better usage properties when compared with the prior art.

Another object was to permit coating of the polyolefin surfaces with a coating formulation or, respectively, adhesive formulation which in particular comprises polar binders.

A third object was to coat the polyolefin surface in such a way that the coating is continuous and even and that the coating has maximum ease of application. This is intended to apply not only to foils but also to moldings.

A further object was to provide a solution which does not adversely affect the weathering resistance of the coating system and which excludes any possibility of toxicological concerns.

Other objects not explicitly mentioned are apparent from the entirety of the following description, claims, and examples.

ACHIEVEMENT OF OBJECT

The objects are achieved through development of a coating system which is suitable for priming various types of substrates and which comprises a film-forming dispersion, characterized in that a polymer type A, an olefin polymer or olefin copolymer, is present, a polymer type B, a (meth)acrylate homo- or/and copolymer comprising standard methacrylates and/or standard acrylates, is present, and a polymer type AB, a graft copolymer made of polymer type A and polymer type B, is present and that the amount of polymer type A is from 5% by weight to 60% by weight, that the amount of polymer type B is from 5% by weight to 70% by weight, that the amount of polymer type AB is from 5% by weight to 70% by weight, based on the total mass of polymer types A, B, and AB, and that the ratio by mass of the entirety of polymer types A, B, and AB to the mass of the solvent or of the solvent mixture is from 3:1 to 1:3, preferably from 2:1 to 1:2.

Surprisingly, it has been found that this type of polymer mixture has good adhesion on polyolefins, although the binder does not comprise halogens or free acid groups. Halogenated binders have great disadvantages in relation to weathering resistance, or in respect of toxicology.

Surprisingly, it has also been found that the coating system of the invention has good solubility with improved solid content in aromatic-free solvents at relatively low temperatures, such as room temperature, when compared with the prior art. Because of these properties, usage properties are markedly improved in comparison with the prior art.

The good solubility properties of the coating system of the invention also mean that the primer which is applied to the substrate and which uses the coating system, and therefore also the second coating applied on the primer, is continuous and even.

The polyolefins to be coated can by way of example involve poly-1-butene, polypropylenes, polyethylenes, polyethylene-propylene copolymers, poly-α-olefins, EPDM, EPM, polybutadienes (including in particular SEBS block copolymers (styrene-ethylene/butene-styrene block copolymers)), or hydrogenated polybutadienes or polyisoprenes.

Acid-functional polymers have particularly high solution viscosities or melt viscosities, especially after solution or, respectively, dispersion in organic solvents. These properties make application more difficult or permit application only from solutions with extremely low solids content. The term acid-free here describes a binder which comprises at most 70 mmol of acid groups/1 g of polymer. The term halogen-free describes a binder which comprises at most 10 mmol of halogen atoms/1 kg of polymer.

The polymer type B can optionally comprise additional functional groups which do not involve halogens or acid groups, but particularly silyl groups. Surprisingly, it has been found that functionalization with silyl groups can not only provide an improvement in adhesion on polyolefins, such as polypropylene, but can also provide a similar improvement in adhesion to the secondary coating subsequently applied.

It has been found that this coating system, suitable for priming various types of substrates, adheres very well to polyolefin substrates and, as primer, can be coated with various types of coating formulations or adhesive formulations which cannot be applied on olefinic surfaces.

The binders of said coating formulations or adhesive formulations can by way of example be based on polyacrylates, on polymethacrylates, on polyurethanes, on polyesters, on polyamides, on polystyrenes, or on a mixture of or copolymer of said components.

Surprisingly, it has also been found that the binder of the invention can also be suitable, as a function of formulation, for priming surfaces other than polyolefins, for example of metals—e.g. aluminum, steel, or zinc—and for priming non-polyolefin plastics—e.g. PVC, PET, polystyrene, ABS, polycarbonate, polymethacrylate, e.g. Plexiglas from Evonik, polyamide, such as nylon-6, or polyethers, such as polyoxymethylene—and for priming other materials, such as wood, granite, concrete, or glass. These primed surfaces can then be coated with a formulation based on polyolefins in the form of adhesive or sealant, or of other coating. One example of this type of inverse use is the adhesive bonding of polar substrates, such as Plexiglas or PVC with polyolefin hotmelts.

Polymer Type A

The olefin polymers and olefin copolymers to be used in the invention, corresponding to A, are known per se. These primarily involve polymers composed of ethylene, of propylene, of butylene, or/and of other α-olefins having from 5 to 20 carbon atoms.

Substantially amorphous poly-α-olefins are particularly useful. Examples of substantially amorphous α-olefins that can be used are homopolymers, e.g. amorphous polypropylene (APP) or amorphous poly-1-butene, or preferably co- and/or terpolymers having the following monomer constitution:

from 0 to 95% by weight, preferably from 3 to 95% by weight, of one or more α-olefins having from 4 to 20 carbon atoms, from 5 to 100% by weight, preferably from 5 to 97% by weight, of propene, and from 0 to 50% by weight, preferably from 0 to 20% by weight, of ethene.

The α-olefin used having from 4 to 20 carbon atoms preferably comprises 1-butene, 1-pentene, 1-hexene, 1-octene, 1-decene, 1-dodecene, 3-methyl-1-butene, a methylpentene, such as 4-methyl-1-pentene, a methylhexene, or a methylheptene, alone or in a mixture.

The production of polymers of this type is described by way of example in EP 0 023 249. The semicrystalline polyolefins of the invention are obtainable by way of example through polymerization of α-olefin monomers with a $TiCl_3 \cdot (AlCl_3)_n$ mixed catalyst (n=0.2 to 0.5), where a trialkylaluminum compound is used as cocatalyst, an example being triethylaluminum, preferably triisopropylaluminum, particularly preferably triisobutylaluminum. The activity of the catalyst used is usually from 5000 to 20 000 g of polymer/g of catalyst. The monomer ethene is used in gaseous form, whereas the monomers propene and 1-butene can be used either in gaseous form or else in liquid form. Higher homologs are used in liquid form. If propene and/or 1-butene is/are used in liquid form, the pressure maintained in the reactor used must be appropriate for the reaction conditions and ensure an adequate concentration of monomer in the liquid phase. Hydrogen in gaseous form is used as chain-transfer agent. The polymerization process is carried out in an inert solvent selected by way of example from the group of the aliphatic hydrocarbons. A polymerization process in the initial charge of monomer is equally possible. The polymerization process is carried out either in a stirred tank or in a stirred-tank cascade; in one particular embodiment, it is also possible to use a tubular reactor or tubular reactor with forced conveying (e.g. a screw-based machine). The reaction temperature is from 30 to 220° C., preferably from 70 to 150° C., and particularly preferably from 80 to 130° C. Catalyst and cocatalyst are decomposed in suitable manner at the end of the reaction, and the decomposed catalyst constituents here either remain within the polymer or are removed by way of a washing step. The polymers of the invention can be stabilized chemically in accordance with the prior art, either in the form of their reaction solution or at a subsequent juncture, in order to protect them from the damaging effect of increased temperatures, insolation, humidity, and oxygen. Examples of stabilizers that can be used here comprise hindered amines (HALS stabilizers), hindered phenols, phosphites, UV absorbers, e.g. hydroxybenzophenones, hydroxyphenyl-benzotriazoles, etc., and/or aromatic amines. The effective amount of stabilizers here is in the range from 0.1 to 2% by weight, based on the polymer. In order to ensure that the granulate and/or powder is flowable, the flow aids usually used in the polymer sector can be used. These can be of either inorganic or organic type, and can comprise either low- or high-molecular-weight components, and in all cases it is possible to use not only crystalline but also amorphous flow aids. The flow aids can be either compatible or incompatible, in the sense of thermodynamic miscibility, with the polyolefins of the claims. Examples are polyolefin waxes, where these can be based not only on polyethylene but also on polypropylene, and Fischer-Tropsch waxes, and also polyolefin waxes based on 1-butene.

The enthalpy of fusion of these unmodified, substantially amorphous poly-α-olefins is in the range from 0 to 80 J/g, preferably in the range from 1 to 70 J/g, particularly preferably in the range from 1 to 60 J/g.

The enthalpy of fusion is a measure of the crystallinity of the polymer. The poly-α-olefins have relatively low crystallinity, i.e. are substantially, but not entirely, amorphous. A certain crystallinity is present, and this is essential for the properties demanded. The crystalline regions detectable during the melting process extend over a wide temperature range from 0° C. to 175° C. and have different intensity depending on their position. A notable feature of the crystallinity of the poly-α-olefins is the occurrence of not only monomodal but also bi- and multimodal melting signals, some of which are separate and distinct, and some of which overlap.

The low crystallinity can firstly give high transparency, and secondly can give flexible mechanical performance. On the other hand, however, higher crystallinity can achieve a particular combination of advantageous properties. Fractions A in the binder of the invention with relatively high crystallinities, e.g. polybutene or butene copolymers having high butene contents, exhibit by way of example very good tensile strength. At the same time, they exhibit relatively low surface tack.

The enthalpy of fusion of the crystalline fraction is determined by differential calorimetry (DSC) to DIN 53 765 from the second heating curve with a heating rate of 10 K/min.

The softening point of the unmodified, substantially amorphous poly-α-olefins, determined by the ring-and-ball method (DIN EN 1427), is moreover from 75 to 165° C., preferably from 79 to 162° C., particularly preferably from 80 to 158° C., and with particular preference from 82 to 155° C., and their needle penetration determined to DIN EN 1426 is at most 55*0.1 mm, preferably from 3 to 50*0.1 mm, particularly preferably from 5 to 45*0.1 mm, and with particular preference from 7 to 42*0.1 mm. The complex melt viscosity at 190° C. determined by oscillation rheology (determined to ASTM D4440-01: "Standard Test Method for Plastics: Dynamic Mechanical Properties Melt Rheology" using an MCR 501 rheometer from Anton Paar with plate-on-plate geometry and with plate diameter of 50 mm, using maximum deformation of 1% and a measurement frequency of 1 Hz) is at most 550 000 mPa*s, preferably at most 350 000 mPa*s, particularly preferably from 2500 to 250 000 mPa*s, and with particular preference from 5000 to 200 000 mPa*s.

In one particular, preferred embodiment, semicrystalline 1-olefin terpolymers based on the monomers ethylene, propylene, and 1-butene are used, where the ethylene content of these determined by $^{13}C$ NMR spectroscopy is from 1 to 12% by weight, preferably from 2 to 10% by weight, particularly preferably from 3 to 9% by weight, and with particular preference from 3.5 to 8% by weight, while the propylene content likewise determined by $^{13}C$ NMR spectroscopy is from 50 to 80% by weight, preferably from 55 to 75% by weight, particularly preferably from 57 to 73% by weight, and with particular preference from 59 to 71% by weight, while the 1-butene content, likewise determined by $^{13}$C NMR spectroscopy, is from 20 to 50% by weight, preferably from 22 to 45% by weight, particularly preferably from 25 to 40% by weight, and with particular preference from 27 to 38% by weight, where the proportions of ethylene, propylene, and 1-butene comonomers give a total of 100%. The needle penetration (determined to DIN EN 1426) of the preferred terpolymers is from 5 to 28*0.1 mm, preferably from 7 to 26*0.1 mm, particularly preferably from 9 to 25*0.1 mm, and with particular preference from 10 to 23*0.1 mm, while the softening point (determined to DIN EN 1427) determined by the ring-and-ball method is from 90 to 125° C., preferably from 95 to 122° C., particularly preferably from 97 to 120° C., and with particular preference from 99 to 118° C., and the complex melt viscosity at 190° C. determined by oscillation rheology (determined to ASTM D4440-01: "Standard Test Method for Plastics: Dynamic Mechanical Properties Melt Rheology" using an MCR 501 rheometer from Anton Paar with plate-on-plate geometry and with plate diameter of 50 mm, using maximum deformation of 1% and a measurement frequency of 1 Hz) is at most 90 000 mPa*s, preferably from 5000 to 75 000 mPa*s, particularly preferably from 7500 to 70 000 mPa*s, and with particular preference from 10 000 to 65 000 mPa*s. The polyolefin terpolymer used for the graft reaction therefore has an ideal property profile, not only in respect of its usefulness in the graft process but also for its subsequent use in the form of grafted product. In particular, the terpolymer preferably used has a good balance between cohesion, adhesion, and flexibility.

The amounts of polymer type A used in the mixture of the invention, based on the polymeric constituents at the end of the reaction, are from 10% by weight to 65% by weight, preferably from 20% by weight to 60% by weight, and very particularly preferably from 25% by weight to 55% by weight.

Polymer Type B

The expression (meth)acrylate used hereinafter means the esters of (meth)acrylic acid and here means either methacrylate, e.g. methyl methacrylate, ethyl methacrylate, etc., or acrylate, e.g. methyl acrylate, ethyl acrylate, etc., and also mixtures of the two.

Monomers which are polymerized to produce the polymer type B are those selected from the group of (meth)acrylates, e.g. alkyl (meth)acrylates of straight-chain, branched, or cycloaliphatic alcohols having from 1 to 40 carbon atoms, for example methyl (meth)acrylate, ethyl (meth)acrylate, n-butyl (meth)acrylate, isobutyl (meth)acrylate, tert-butyl (meth) acrylate, pentyl (meth)acrylate, 2-ethylhexyl (meth)acrylate, stearyl (meth)acrylate, lauryl (meth)acrylate, cyclohexyl (meth)acrylate, isobornyl (meth)acrylate; aryl (meth)acrylates, e.g. benzyl (meth)acrylate or phenyl (meth)acrylate, where each of these may be unsubstituted or may have aryl moieties having from 1 to 4 substituents; other aromatically substituted (meth)acrylates, e.g. naphthyl (meth)acrylate; mono(meth)acrylates of ethers, of polyethylene glycols, of polypropylene glycols, or a mixture of these having from 5 to 80 carbon atoms, e.g. tetrahydrofurfuryl methacrylate, methoxy(m)ethoxyethyl methacrylate, 1-butoxypropyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate, and poly(propylene glycol) methyl ether (meth)acrylate.

The expression standard methacrylates and, respectively, standard acrylates means esters of (meth)acrylic acid where these are used industrially in the synthesis of poly(meth) acrylate molding compositions, of adhesives, of sealants, or of binders in coatings. This relates in particular to methyl (meth)acrylate, ethyl (meth)acrylate, propyl (meth)acrylate, n-butyl (meth)acrylate, isobutyl (meth)acrylate, tert-butyl (meth)acrylate, and 2-ethylhexyl (meth)acrylate.

The compositions to be polymerized can also comprise, alongside the (meth)acrylates described above, other unsaturated monomers which are copolymerizable with the above-mentioned (meth)acrylates. Among these are inter alia 1-alkenes, such as 1-hexene and 1-heptene, branched alkenes, such as vinylcyclohexane, 3,3-dimethyl-1-propene, 3-methyl-1-diisobutylene, and 4-methyl-1-pentene, acrylonitrile, vinyl esters, e.g. vinyl acetate, styrene, substituted styrenes having an alkyl substituent on the vinyl group, e.g. α-methylstyrene and α-ethylstyrene, substituted styrenes having one or more alkyl substituents on the ring, e.g. vinyltoluene and p-methylstyrene; heterocyclic compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, 9-vinylcarbazole, 3-vinylcarbazole, 4-vinylcarbazole, 2-methyl-1-vinylimidazol, vinyloxolane, vinylfuran, vinylthiophene, vinylthiolane, vinylthiazoles, vinyloxazoles, and isoprenyl ethers; maleic acid derivatives, such as maleimide and methylmaleimide, and dienes, such as divinylbenzene.

The amounts of polymer type B used in the mixture of the invention, based on the polymeric constituents at the end of the reaction, are from 35% by weight to 90% by weight, preferably from 40% by weight to 80% by weight, and very particularly preferably from 45% by weight to 75% by weight.

The side branches of the graft copolymers can optionally also comprise silyl groups in order to improve adhesion.

Examples that may be listed of the silyl moieties are —Si(OMe)$_3$, —SiMe(OMe)$_2$, —SiMe$_2$(OMe), —Si(OPh)$_3$, —SiMe(OPh)$_2$, —SiMe$_2$(OPh), —Si(OEt)$_3$, —SiMe(OEt)$_2$, —SiMe$_2$(OEt), —Si(OPr)$_3$, —SiMe(OPr)$_2$, —SiMe$_2$(OPr), —SiEt(OMe)$_2$, —SiEtMe(OMe), —SiEt$_2$(OMe), —SiPh(OMe)$_2$, —SiPhMe(OMe), —SiPh$_2$(OMe), —SiMe(OC(O)Me)$_2$, —SiMe$_2$(OC(O)Me), —SiMe(O—N=CMe$_2$)$_2$ and —SiMe$_2$(O—N=CMe$_2$). The meanings of the abbreviations here are as follows: Me means methyl, Ph means phenyl, Et means ethyl, and Pr means iso- or n-propyl.

One way of incorporating silyl groups of this type in polymer type B is copolymerization of silyl-functional (meth) acrylates. Examples that may be listed of the (meth)acrylate moieties are H$_2$C=CHC(O)O—CH$_2$—, H$_2$C=CCH$_3$C(O)O—CH$_2$—, H$_2$C=CHC(O)O—(CH$_2$)$_2$—, H$_2$C=CCH$_3$C(O)O—(CH$_2$)$_2$—, H$_2$C=CHC(O)O—(CH$_2$)$_3$—, and H$_2$C=CCH$_3$C(O)O—(CH$_2$)$_3$—.

An example of a commercially available monomer would be Dynasylan® MEMO from Evonik Degussa GmbH. This comprises 3-methacryloyloxypropyltrimethoxy-silane.

Another way of incorporating silyl groups of this type in polymer type B is copolymerization of other silyl-functional monomers which have a copolymerizable olefinic group, e.g. an allyl or vinyl group.

An example of a commercially available monomer would be Dynasylan® VTMO from Evonik Degussa GmbH. This comprises vinyltrimethoxysilane.

A third way of incorporating silyl groups in polymer type B is the use of silyl-functional chain-transfer agents which by way of example have a thiol group.

An example of a commercially available monomer would be Dynasylan® MTMO from Evonik Degussa GmbH. This comprises 3-mercaptopropyltrimethoxysilane. Other available silanes are 3-mercaptopropyltriethoxysilane, 3-mercaptopropyl-methyldimethoxysilane, and mercaptomethylmethyldiethoxysilane (from ABCR). The proportion of silyl-functional monomers in the monomer mixture B is from 0% by weight to 20% by weight, preferably from 0% by weight to 10% by weight, and particularly preferably from 0% by weight to 5% by weight.

The Polymer Type AB

Production of the Graft Polymers AB

The graft polymer AB is generally produced by producing a solution of strength from 5 to 50% by weight, preferably from 10 to 25% by weight, of the polymer of type A, preferably of a poly-α-olefin, in a suitable solvent which is inert under polymerization conditions and which has a normal boiling point above the process temperature, by stirring the polymer in the solvent, preferably above the softening point of the poly-α-olefin. To this solution, which should be as homogeneous as possible, a suitable initiator is then added at reaction temperature, preferably a peroxidic free-radical initiator. After an initiation time of from 0 to 60 min, preferably from 0 to 30 min, particularly preferably from 1 to 20 min, the monomer mixture for synthesis of the polymer type B is added, or is metered into the mixture over a relatively long period. It is preferable to use peresters, such as tert-butyl peroctoate. The initiator concentration depends on the number of graft sites desired and on the desired molecular weight of the segment B. Initiator concentration is generally from 0.2% by weight to 3% by weight, based on the polymer. This process naturally forms a poly(meth)acrylate of type B in parallel with the graft reaction.

As an alternative for poly-α-olefins which are not miscible with the solvent under the conditions described, for example because of a softening point which is above the boiling point of the solvent, it is possible to add emulsifiers. In this case, the graft reaction is carried out analogously in an organic dispersion.

The polymerization time is usually from 4 to 8 hours. The polymerization temperature is not critical. However, it is generally in the range from −20° C. to 200° C., preferably from 0° C. to 130° C., and particularly preferably from 50° C. to 120° C.

In an alternative method, using a suitable emulsifier, a dispersion is produced from component A, and monomers which lead to component B are grafted onto this dispersion under the reaction conditions suitable for this purpose, by analogy with the first method. The structure of emulsifier can be similar to that of the AB system. The processes for producing suitable emulsifiers of type AB are known per se. By way of example, the procedure can use the transfer grafting method (cf. also Houben-Weyl, Methoden der Org. Chemie [Methods of organic chemistry], volume 1411, p. 114, H. A. J. Battaerd, G. W. Tregear, Polymer Reviews, Vol. 16, Interscience (1967)).

The process can be carried out in suitable solvents, such as $H_2O$; acetates, preferably butyl acetate, ethyl acetate, propyl acetate; ketones, preferably ethyl methyl ketone, acetone; ethers; aliphatics, preferably pentane, hexane; biodiesel; or else plasticizers, such as low-molecular-weight polypropylene glycols or phthalates. It is preferable to produce the binder of the invention in aromatic-free solvent systems. Aromatics are toxicologically hazardous and, even in industrial applications, should be avoided as far as possible. Surprisingly, it has been found that the production of graft copolymers in the invention can be carried out particularly successfully in acetates, such as butyl acetate.

The softening point of the poly-α-olefin often restricts the choice of the solvent. The boiling point of the selected solvent should ideally be above that range. As an alternative, the graft reaction can be carried out under pressure.

It is also possible to use mixtures made of the solvents described above for the carrier system. The ratio by mass of the entirety of the polymer types A, B, and AB to the mass of the solvent or of the solvent mixture can be from 3:1 to 1:3, preferably from 2:1 to 1:2. The solvent mixture preferably comprises no aromatics.

The binders of the invention can be produced not only by solution polymerization but also by means of emulsion, miniemulsion, microemulsion, suspension, or bulk polymerization.

An alternative method is bulk polymerization, in particular continuous bulk polymerization. This can take the form of reactive extrusion or can be carried out in a polymerization kneader. This type of process has the advantage that the product is obtained in a form free from solvents and can be used in this form directly in melt applications, for example hot-melt adhesives or reactive hot-melt adhesives. A solvent-free system is also particularly suitable for what are known as high solids coatings, the principle of which is maximization of solids content. Formulation with an undiluted product of the invention avoids further dilution of this type of coating formulation. In contrast, in the case of polymers produced by means of solution polymerization, an additional process step is first required to remove the solvent, prior to any of said applications. In the case of emulsion polymers or suspension polymers, the residual water first has to be removed by drying. This is particularly important in the case of reactive, possibly moisture-crosslinking systems.

In the case of a graft process in solution, the reaction temperature for the graft process is from 30 to 200° C., preferably from 40 to 190° C., particularly preferably from 50 to 180° C., and with particular preference from 55 to 140° C. The solution grafting process takes place either batchwise or continuously. In the case of batchwise conduct of the reaction, the solid polymer (e.g. in the form of granules, powder, etc.) is first dissolved in the solvent used. As an alternative to this, a suitably prepared polymerization solution from the main-polymer-production process is used directly and brought to reaction temperature. The monomer(s) and the free-radical initiator(s) are then added. In one particularly preferred embodiment, solvent, main polymer(s), and monomer(s) are used as initial charge and brought to reaction temperature, while the free-radical initiator(s) is/are metered into the mixture continuously over a defined period. This has the advantage that steady-state free-radical concentration is low, and the ratio of graft reaction to chain cleavage is therefore particularly advantageous (i.e. more graft reaction and less chain cleavage). In another particularly preferred embodiment, solvent and main polymer(s) are used as initial charge and brought to reaction temperature, while monomer(s) and free-radical initiator are continuously metered into the mixture over a defined period—together (e.g. in the form of a mixture) or separately from one another. This has the advantage that both steady-state free-radical concentration and monomer concentration at the reaction site are low, and this suppresses not only chain cleavage but also formation of homopolymers. This is particularly important when monomers are used which have a marked tendency toward thermally initiated (homo)polymerization at reaction temperature. It is very particularly preferable that, following the various defined metering periods, a further amount of free-radical initiator(s) is metered into the mixture, in order to minimize the content of residual monomers in the reaction solution. It is preferable to use a stirred tank as reactor, but it is equally possible to use alternative reaction vessels, e.g. batch kneading reactors, and this is particularly preferred in the case of low reaction temperatures and/or high polymer concentrations.

In the case of continuous conduct of the reaction, the solid polymer is first dissolved in at least one solvent, in one or more feed vessels (e.g. stirred tanks), and is then fed continuously into the reaction vessel(s). In an alternative, likewise particularly preferred, embodiment, an appropriately prepared polymer solution is used directly from a main-polymer-production process. In another, likewise particularly preferred, embodiment, the solid polymer (e.g. in the form of powder, granules, pellets, etc.) is fed together with at least one solvent continuously into a (single- or multiscrew) screw-based machine or a Conti kneader, dissolved with exposure to heat and/or shear, and is then fed continuously into the reaction vessel(s). Reaction vessels or reactors that can be used for carrying out the continuous graft reaction in solution are continuous stirred tanks, stirred-tank cascades, tubular reactors, tubular reactors with forced conveying (e.g. screw-based machines), reactive kneaders, and also any desired combinations of these. If tubular reactors with forced conveying are used, these preferably involve extruders, and it is possible here to use either single-, twin-, or multiscrew extruders. It is particularly preferable to use twin- and/or multiscrew extruders. A particularly preferred reactor combination for the continuous production of the modified polymers of the invention in solution is a reactor combination made of tubular reactor, tubular reactor with forced conveying, and continuous stirred tank in any desired sequence, and it is preferable here that the removal of residual monomers and of volatile byproducts/degradation products also takes place either in the tubular reactor with forced conveying or in the continuous stirred tank.

As an alternative, a melt process is preferably involved, where at least one free-radical initiator is fed directly into the melt. In particular, in this process variant, the temperature of the polymer composition at the time of metering of at least one free-radical initiator into the mixture is above the SADT (self-accelerating decomposition temperature=temperature above which self-accelerating decomposition can begin to occur) of at least one of the free-radical initiators metered into the mixture.

The reaction temperature for the graft process in the melt is from 160 to 250° C., preferably from 165 to 240° C., particularly preferably from 168 to 235° C., and with particular preference from 170 to 230° C.

The grafting in the melt takes place either batchwise or continuously. In the case of batchwise conduct of the reaction, the solid polymer (e.g. in the form of granules, powder, pellets, etc.) is first melted and optionally homogenized. As an alternative, an appropriately prepared polymer melt is used directly from a polymerization process and brought to reaction temperature. Monomer(s) and free-radical initiator(s) are then added.

In one particular embodiment, monomer(s) and polymer melt are mixed homogeneously and brought to reaction temperature, while the free-radical initiator(s) is/are metered into the mixture continuously over a defined period. This has the advantage that steady-state free-radical concentration is low, and the ratio of graft reaction to chain cleavage is therefore particularly advantageous (i.e. more graft reaction and less chain cleavage).

In another particularly preferred embodiment, the polymer melt is used as initial charge and homogenized, while monomer(s) and free-radical initiator are metered into the mixture continuously together (e.g. in the form of a mixture) or separately over a defined period. This has the advantage that not only steady-state free-radical concentration but also monomer concentration at the reaction site remains low, and this suppresses not only chain cleavage but also formation of homopolymer. The latter is particularly important when using monomers which have a tendency toward thermal (homo) polymerization at the prevailing reaction temperature. The reactor used preferably comprises a stirred tank with stirrer assembly operating close to the wall, or a reactive kneader.

In the case of continuous conduct of the reaction, the solid polymer is first melted in one or more feed vessels (e.g. stirred tanks), and is then fed continuously into the reaction vessel(s). In an alternative, likewise particularly preferred, embodiment, an appropriately prepared polymer melt is used directly from a polymerization process. In another likewise particularly preferred embodiment, the solid polymer (e.g. in the form of powder, granules, pellets, etc.) is fed continuously into a (single- or multiscrew) screw-based machine or a Conti kneader, melted with use of heat and/or shear, and then fed continuously into the reaction vessel(s). Reaction vessels or reactors that can be used for carrying out the continuous graft reaction in the melt are continuous stirred tanks, stirred-tank cascades, tubular reactors, tubular reactors with forced conveying (e.g. screw-based machines), reactive kneaders, and also any desired combinations of these. If tubular reactors with forced conveying are used, these preferably involve extruders, and it is possible here to use either single-, twin-, or multiscrew extruders. It is particularly preferable to use twin- and/or multiscrew extruders. A particularly preferred reactor combination for the continuous production of the modified polymers of the invention in the melt is a reactor combination made of tubular reactor, tubular reactor with forced conveying, and continuous stirred tank in any desired sequence, and it is preferable here that the removal of residual monomers and of volatile byproducts/degradation products also takes place either in the tubular reactor with forced conveying or in the continuous stirred tank.

Chain-transfer agents can also optionally be used for adjusting to the desired molecular weight for the segments B. Examples of suitable chain-transfer agents are sulfur chain-transfer agents, in particular chain-transfer agents containing mercapto groups, e.g. dodecyl mercaptan. The concentration of chain-transfer agents is generally from 0.1% by weight to 2.0% by weight, based on the entire polymer.

Another method for producing the graft polymers AB is provided by the hydroperoxidation of a poly-α-olefin as first step. The hydroperoxide groups thus formed along the chain can initiate the graft polymerization of the vinyl monomers in a subsequent stage (cf. H. A. J. Battaerd, G. W. Tregear, Polymer Reviews, ibid.).

The amounts of polymer type AB used in the mixture of the invention are based on the polymeric constituents at the end of the reaction, from 5% by weight to 70% by weight, preferably from 20% by weight to 60% by weight, and very particularly preferably from 25% by weight to 50% by weight.

The binders of the invention can be used for priming various substrates. The binder of the invention is preferably used for priming polyolefin surfaces, and is particularly preferably used for priming polypropylene surfaces. The primer can in turn be coated with a second formulation or substance. This can by way of example involve a coating, an adhesive, or a sealant. The second layer can moreover involve an adhesion promoter, which is in turn coated. The coated surfaces can by way of example involve the surfaces of foils, tube, cable sheathing, of granules, of injection moldings or of moldings produced in any other way, of composite materials, or of laminates. All of these products are hereinafter covered by the term "workpiece".

The workpieces primed in this way and subsequently coated can be used in the packaging industry, e.g. for food or drink or for pharmaceutical products, in automobile construction, in shipbuilding, in the electronics industry, in the construction industry, in furniture construction, in engineering, or in the production of toys.

The method of coating with the primer can by way of example be analogous to that for coil coating, by way of rolls. It is also possible to apply the primer to the surface by a spray process or coating process. Other methods that can also be used are those such as spincoating or dipcoating. It is also equally possible to remove the solvent prior to the application process, and to prime the substrate surface by means of extrusion coating or coextrusion.

EXAMPLES

Measurement of Dynamic Viscosity η

Dynamic viscosity η is measured to DIN EN ISO 53018.
Measurement of Solids Content Rapid weighing-out of from 0.3 to 0.5 g of polymer solution to an accuracy of 0.1 mg into a tared aluminum dish followed by addition of 5 mL of acetone as entrainer. The solvent is then evaporated first for 60 min at room temperature and then for a further 60 min at 105° C. The specimen is cooled in a desiccator and weighed, and the difference in weight is determined. Three measurements are carried out for each specimen. In the event of deviations greater than 0.2% by weight, additional measurements are carried out.

Test Foil

Test foil used for assessing PP adhesion comprised a PP foil extruded from JE6100 granulate from Shell with thickness 200 μm.

Determination of PP Adhesion of Coatings

The PP adhesion of a binder on various substrate surfaces was studied to DIN EN ISO 2409 by means of a crosscut test inclusive of adhesive-tape peel (hereinafter Tesa peel test). To this end, the unaltered specimen with the solids content established after the synthesis process is applied with a wet layer thickness of 60 μm to the substrate by means of a wire-wound rod, and dried overnight at room temperature. The result is evaluated using grades from 0 (particularly good adhesion) to 5 (no adhesion). The tables state two values: the first involves visual assessment after the Tesa peel test, and the second involves visual assessment after the cutting process.

a) Examples of the Polyolefins (Polymer Type A) Used in the Invention

Ethene, propene, and 1-butene are polymerized in n-butane in a laboratory autoclave at 95° C., using a mixed catalyst of a crystalline titanium chloride in the form of aluminum-reduced $TiCl_3$ ($TiCl_3$*0.33 $AlCl_3$) and triisobutylaluminum (in a ratio by weight of 1:4), with hydrogen used as chain-transfer agent. The monomers ethene and propene are metered continuously into the mixture during the reaction time of 3 h, and the monomer 1-butene is used as initial charge. After 3 h, isopropanol is admixed with the reaction mixture, thus terminating the reaction. An acetone solution of a stabilizer (e.g. Irganox) is then added. Unreacted monomers, and also the solvent n-butane, are evaporated in an evaporator. The melt of the substantially amorphous polyolefin is discharged at a temperature of about 190° C.

The properties of the polymers are as follows

| Experiment No. | Polymer constitution ($^{13}$C NMR) | | | $T_{soft.}$ [° C.] | PEN [0.1 mm] | η* 190° C. [mPa * s] |
|---|---|---|---|---|---|---|
| | Ethene | Propene | 1-Butene | | | |
| comp 1 | 0 | 2 | 98 | 118 | 5 | 6750 |
| 1 | 2 | 24 | 74 | 85 | 13 | 24 300 |
| 2 | 0 | 61 | 39 | 132 | 9 | 3100 |
| 3 | 3.5 | 84.5 | 12 | 106 | 14 | 48 600 |
| 4 | 5.1 | 61.4 | 35 | 117 | 15 | 223 000 |
| 5 | 4 | 67.3 | 28.7 | 112 | 10 | 41 800 |

Comparative example comp1 is not of the invention, because of the very low propylene content.

Examples of the Graft Copolymers (Polymer Type AB) Synthesized in the Invention

Example 6

240 g of n-butyl acetate and 100 g of polyolefin of type 1 are used as initial charge in a jacketed vessel with attached thermostat, reflux condenser, blade stirrer, and internal thermometer. The polyolefin is completely dissolved within one hour at 100° C., with stirring, and 0.78 g of tert-butyl 2-ethylperhexanoate are then admixed therewith. A metering pump is then used to meter a mixture made of 75 g of methyl methacrylate, 75 g of n-butyl acrylate, and 2.3 g of tert-butyl 2-ethyl-perhexanoate into the mixture over a period of 90 min.

After a further 150 min of reaction time, the polymer solution is cooled to 50° C. and diluted with 180 g of n-butyl acetate in order to reduce solution viscosity. After a further 60 min of stirring for homogenization, the dispersion is cooled to room temperature.

Example 7

316 g of n-butyl acetate and 120 g of polyolefin of type 3 are used as initial charge in a jacketed vessel with attached thermostat, reflux condenser, blade stirrer, and internal thermometer. The polyolefin is completely dissolved within one hour at 100° C., with stirring, and 1.46 g of tert-butyl 2-ethylperhexanoate are then admixed therewith. A metering pump is then used to meter a mixture made of 140 g of methyl methacrylate, 140 g of n-butyl acrylate, and 4.25 g of tert-butyl 2-ethylperhexanoate into the mixture over a period of 90 min.

After a further 150 min of reaction time, the polymer solution is cooled to 50° C. and diluted with 244 g of n-butyl acetate in order to reduce solution viscosity. After a further 60 min of stirring for homogenization, the dispersion is cooled to room temperature.

Example 8

327 g of n-butyl acetate and 120 g of polyolefin of type 5 are used as initial charge in a jacketed vessel with attached thermostat, reflux condenser, blade stirrer, and internal thermometer. The polyolefin is completely dissolved within one hour at 100° C., with stirring, and 2.91 g of tert-butyl 2-ethylperhexanoate are then admixed therewith. A metering pump is then used to meter a mixture made of 280 g of n-butyl acrylate and 8.51 g of tert-butyl 2-ethylperhexanoate into the mixture over a period of 90 min.

After a further 150 min of reaction time, the polymer solution is cooled to 90° C. and diluted with 243 g of n-butyl acetate in order to reduce solution viscosity. After a further 60 min of stirring for homogenization, the dispersion is cooled to room temperature.

Example 9

316 g of n-butyl acetate and 120 g of polyolefin of type 5 are used as initial charge in a jacketed vessel with attached thermostat, reflux condenser, blade stirrer, and internal thermometer. The polyolefin is completely dissolved within one hour at 100° C., with stirring, and 1.46 g of tert-butyl 2-ethylperhexanoate are then admixed therewith. A metering pump is then used to meter a mixture made of 136 g of methyl methacrylate, 136 g of n-butyl acrylate, and 8 g of 3-methacryloyloxypropyltrimethoxysilane, and 4.25 g of tert-butyl 2-ethylperhexanoate into the mixture over a period of 90 min.

After a further 150 min of reaction time, the polymer solution is cooled to 50° C. and diluted with 244 g of n-butyl acetate in order to reduce solution viscosity. After a further 60 min of stirring for homogenization, the dispersion is cooled to room temperature.

Example 10

316 g of n-butyl acetate and 120 g of polyolefin of type 5 are used as initial charge in a jacketed vessel with attached thermostat, reflux condenser, blade stirrer, and internal thermometer. The polyolefin is completely dissolved within one hour at 100° C., with stirring, and 1.46 g of tert-butyl 2-ethylperhexanoate are then admixed therewith. A metering pump is then used to meter a mixture made of 272 g of n-butyl acrylate, 8 g of 3-methacryloyloxypropyltrimethoxysilane, and 4.25 g of tert-butyl 2-ethylperhexanoate into the mixture over a period of 90 min.

After a further 150 min of reaction time, the polymer solution is cooled to 50° C. and diluted with 244 g of n-butyl acetate to reduce solution viscosity. After a further 60 min of stirring for homogenization, the dispersion is cooled to room temperature.

Example 11

316 g of n-butyl acetate and 120 g of polyolefin of type 5 are used as initial charge in a jacketed vessel with attached thermostat, reflux condenser, blade stirrer, and internal thermometer. The polyolefin is completely dissolved within one hour at 100° C., with stirring, and 1.46 g of tert-butyl 2-ethylperhexanoate are then admixed therewith. A metering pump is then used to meter a mixture made of 272 g of n-butyl methacrylate, 8 g of 3-methacryloyloxypropyltrimethoxysilane, and 4.25 g of tert-butyl 2-ethylperhexanoate into the mixture over a period of 90 min.

After a further 150 min of reaction time, the polymer solution is cooled to 50° C. and diluted with 244 g of n-butyl acetate to reduce solution viscosity. After a further 60 min of stirring for homogenization, the dispersion is cooled to room temperature.

Results of Example Synthesis Process

| Experiment No. | $\eta_{190° C.}$ [mPa * s] | Solids content % by wt. | Appearance | Polyolefin/ Poly(meth)acrylate |
|---|---|---|---|---|
| 6 | 3500 | 36.2 | white, disperse | 40/60 |
| 7 | 1600 | 40.2 | white, disperse | 30/70 |
| 8 | 360 | 40.4 | white, disperse | 30/70 |
| 9 | 2300 | 40.6 | white, disperse | 30/70 |
| 10 | 180 | 40.6 | white, disperse | 30/70 |
| 11 | 6800 | 39.8 | white, disperse | 30/70 |

On the basis of these results it can be shown that the viscosities found were surprisingly low. Even with a solids content of about 40% by weight and with a proportion of 30% by weight or 40% by weight of polyolefin in the solid, the solutions or dispersions, respectively, have good processibility, and all of them exhibit no, or only slight, phase separation. Only example 8 exhibited slight phase separation after 7 days of storage, to give a clear liquid phase and a white disperse liquid phase. However, the specimen could easily be redispersed by shaking or stirring. The polymer dispersions of the invention therefore have surprisingly good shelflife.

Visual Assessment of the Films after Tesa Peel Test and Crosscut Test

| | Visual assessment | |
|---|---|---|
| Example | Tesa peel test | Crosscut test |
| 6 | 1 | 3 |
| 7 | 1 | 3 |
| 9 | 0 | 2 |

These experiments showed that the binders of the invention exhibit adequate adhesion to PP foils and can also be used as primers for further coatings. If the primer layers of the invention are coated with an additional coating layer, for example based on methacrylate, an example being DEGALAN LP 64/12 from Evonik, the expectation is that this should not lead to any change in the results.

What is claimed is:

1. A primer, comprising a film-forming dispersion or solution, comprising:
   an A polymer, which comprises a polyolefin or a polyolefin mixture;
   a B polymer, which comprises at least one member selected from the group consisting of a (meth)acrylate homopolymer and a (meth)acrylate copolymer, comprising at least one member selected from the group consisting of a standard methacrylate and a standard acrylate; and
   an AB polymer, which comprises a graft copolymer comprising the A polymer and the B polymer,
   wherein the film-forming dispersion or solution is halogen-free and acid-free; and
   wherein the primer is suitable for coating at least one polyolefin,
   wherein the B polymer and the AB polymer have silyl groups, wherein the AB polymer is a graft copolymer comprising a polyolefin main chain and at least one poly(meth)acrylate side chain.

2. The primer of claim 1, further comprising a solvent, wherein a ratio by mass of all of the A, B, and AB polymers to a mass of the solvent or solvent mixture is from 3:1 to 1:3.

3. The primer of claim 2, wherein the solvent or the solvent mixture comprises no aromatics.

4. The primer of claim 1, wherein a ratio by mass of all of the A, B, and AB polymers to a mass of a solvent or solvent mixture is from 2:1 to 1:2.

5. The primer of claim 1, wherein the A polymer comprises at least one member selected from the group consisting of an atactic polypropylene, atactic poly-1-butene, and a copolymer or terpolymer of the following monomer constitution:
from 0 to 95% by weight of one or more α-olefins having from 4 to 20 carbon atoms;
from 5 to 100% by weight of propene; and
from 0 to 50% by weight of ethene.

6. The primer of claim 5, wherein at least one member is a copolymer or a terpolymer and where the α-olefins having from 4 to 20 carbon atoms comprise at least one member selected from the group consisting of 1-butene, 1-pentene, 1-hexene, 1-octene, 1-decene, 1-dodecene, 3-methyl-1-butene, a methylpentene, a methylhexene, and a methylheptene.

7. The primer of claim 5, wherein the A polymer comprises at least one member selected from the group consisting of the copolymer and the terpolymer,
wherein of the monomer constitution of the at least one member is:
from 3 to 95% by weight of one or more α-olefins having from 4 to 20 carbon atoms;
from 5 to 100% by weight of propene; and
from 0 to 50% by weight of ethene.

8. The primer of claim 5, wherein the A polymer comprises at least one member selected from the group consisting of the copolymer and the terpolymer,
wherein of the monomer constitution of the at least one member is:
from 0 to 95% by weight of one or more α-olefins having from 4 to 20 carbon atoms;
from 5 to 100% by weight of propene; and
from 0 to 20% by weight of ethene.

9. The primer of claim 5, wherein the A polymer comprises at least one member selected from the group consisting of the copolymer and the terpolymer,
wherein of the monomer constitution of the at least one member is:
from 3 to 95% by weight of one or more α-olefins having from 4 to 20 carbon atoms;
from 5 to 97% by weight of propene; and
from 0 to 50% by weight of ethene.

10. The primer of claim 5, wherein the A polymer comprises at least one member selected from the group consisting of the copolymer and the terpolymer,
wherein of the monomer constitution of the at least one member is:
from 3 to 95% by weight of one or more α-olefins having from 4 to 20 carbon atoms;
from 5 to 97% by weight of propene; and
from 0 to 20% by weight of ethene.

11. The primer as claimed in claim 1, wherein the B polymer comprises reacted units of a (meth)acryloyloxyalkyltrialkoxysilane.

12. The primer as claimed in claim 1, wherein the B polymer comprises reacted units of 3-methacryloyloxypropyltrimethoxysilane.

13. The primer as claimed in claim 1, wherein the A polymer is a polyolefin comprising from 24 to 84.5% propene, from 12 to 74% 1-butene and from 0 to 5.1% ethene; and the B polymer comprises reacted units of methyl methacrylate, n-butyl acrylate, and 3-methacryloyloxypropyltrimethoxysilane.

14. A process for priming a polyolefin substrate, comprising:
applying the primer of claim 1 in the form of solution to the substrate; and
drying the primer.

15. The process of claim 14, further comprising:
applying a second layer to a primer layer.

16. The process as claimed in claim 15, wherein the second layer comprises a coating, an adhesive, or a sealant.

17. A foil, molding, tube, or cable sheathing, coated by the process of claim 14.

18. A process for priming a polar substrate, comprising:
applying the primer of claim 1 in the form of solution to the substrate;
then drying the primer, to obtain a primer layer; and
applying a second layer which mainly comprises at least one polyolefin to the primer layer.

19. The process of claim 18, wherein the second layer comprises an adhesive or a sealant.

20. A foil, molding, tube, or cable sheathing, coated by the process of claim 18.

* * * * *